United States Patent [19]

Kash et al.

[11] Patent Number: 5,343,542
[45] Date of Patent: Aug. 30, 1994

[54] TAPERED FABRY-PEROT WAVEGUIDE OPTICAL DEMULTIPLEXER

[75] Inventors: Jeffrey A. Kash, Pleasantville, N.Y.; Bardia Pezeshki, Bridgeport; Franklin F. Tong, Stamford, both of Conn.

[73] Assignee: International Business Machines Corporation, Armonk, N.Y.

[21] Appl. No.: 52,343

[22] Filed: Apr. 22, 1993

[51] Int. Cl.$^5$ ............................ G02B 6/10; H01S 3/19; G01B 9/02
[52] U.S. Cl. .......................................... 385/31; 385/14; 385/43; 385/47; 385/131; 372/7; 372/45; 372/50; 372/92; 372/98; 372/99; 356/352; 359/115; 359/124; 359/127
[58] Field of Search ................. 385/31, 14, 43, 47, 385/129, 130, 131, 132; 372/22, 23, 43, 45, 49, 50, 92, 98, 99, 7; 356/352; 359/114, 115, 124, 127

[56] References Cited

U.S. PATENT DOCUMENTS

| | | | |
|---|---|---|---|
| 4,715,672 | 12/1987 | Duguay et al. | 385/129 X |
| 4,745,607 | 5/1988 | Koch | 372/45 |
| 4,825,262 | 4/1989 | Mallinson | 356/352 X |
| 4,861,136 | 8/1989 | Stone et al. | 356/352 X |
| 5,060,235 | 10/1991 | Ikeda | 372/23 X |
| 5,144,498 | 9/1992 | Vincent | 356/320 |
| 5,191,219 | 3/1993 | Linke | 385/14 |
| 5,268,985 | 12/1993 | Ando et al. | 385/129 |
| 5,282,260 | 1/1994 | Buchal et al. | 385/132 |
| 5,285,274 | 2/1994 | Tanno et al. | 385/129 |

OTHER PUBLICATIONS

Soole et al., "Monolithic InP/InGaAsP/InP grating . . ." Appl. Phys Lett. vol. 58, No. 18 May 1991 pp. 1949–1951.
Cremer et al., "Grating Spectrograph . . ." IEEE Photonics Tech. Lett. vol. 4, No. 1 Jan. 1992 pp. 108–110.
Takahashi et al., "Polarization-insensitive arrayed-waveguide . . ." IEEE LEOS 1992 Conf Proc. pp. 688–689.
Dragone, "An N×N Optical Multiplexer . . ." IEEE Photonics Tech. Lett. vol. 3, No. 9 Sep. 1991 pp. 812–814.
Levy et al., "Fabrication of Narrow-Band . . ." IEEE Photonics Tech. Lett. vol. 4, No. 12 Dec. 1992 pp. 1379–1381.
Duguay et al., "Antiresonant reflecting optical waveguides . . ." Appl. Phys. Lett 49(1) Jul. 1986 pp. 13–15.
Baba et al., "Monolithic Integration of an Arrow-Type . . ." Journ. of Lightwave Tech vol. 8, No. 1 Jan. 1990 pp. 99–104.
Marcuse, "Directional Couplers Made of Nonidentical . . ." Journ. of Lightwave Tech vol. LT-5 No. 1 Jan. 1987 pp. 113–118.
Marcuse, "Directional Couplers . . ." Journal of Lightwave Tech., vol. LT-5, No. 2 Feb. 1987 pp. 268–272.
Alferness et al., "Simultaneous Modulation . . ." Electron. Lett. vol. 21, No. 11 May 1985 pp. 466–467.

Primary Examiner—Brian Healy
Attorney, Agent, or Firm—Douglas W. Cameron

[57] ABSTRACT

This invention covers apparatus for providing a compact, high resolution waveguide optical demultiplexer or spectrometer for application in optical communications. With this invention, incoming light composing many discrete wavelengths or optical channels is spectrally resolved by the waveguide demultiplexer such that the wavelength channels are separated spatially. The two major elements of this invention are a waveguide having a partial mirror along its length to reflect optical frequencies therein, and an optical resonator where one of its resonating mirrors is the partial mirror of the waveguide. Selected frequencies are then extracted from the waveguide and resonated in the resonator.

8 Claims, 4 Drawing Sheets

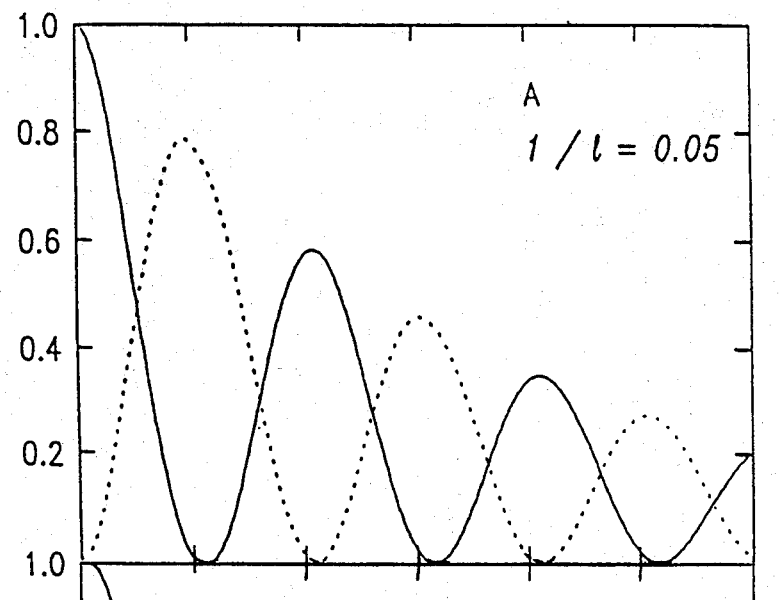
FIG. 3.1
OPTICAL POWER
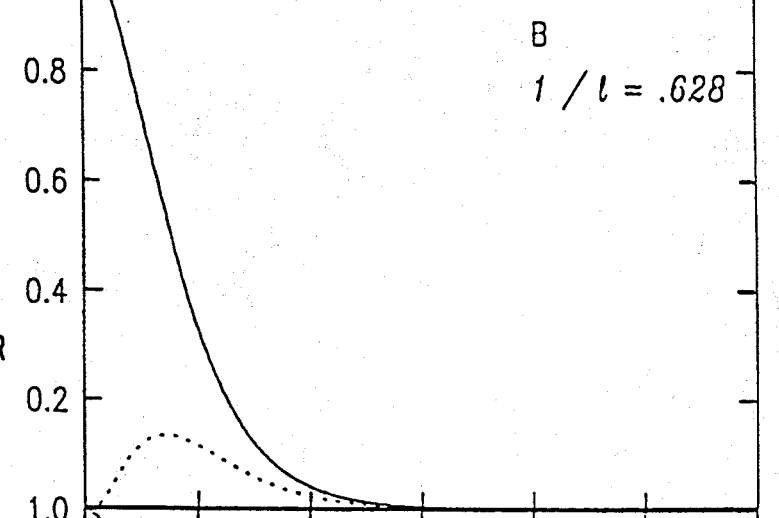
FIG. 3.2
OPTICAL POWER
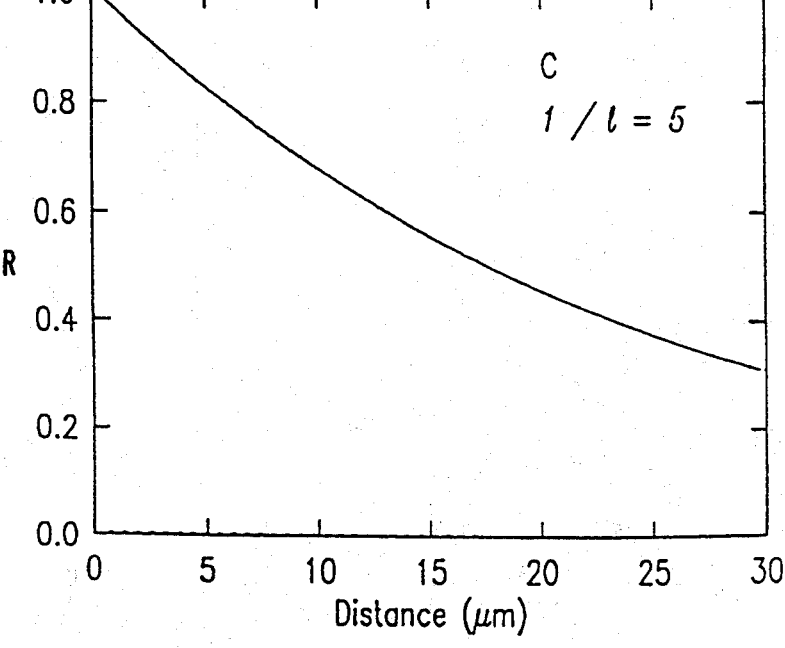
FIG. 3.3
OPTICAL POWER
Distance (μm)

TAPERED FABRY-PEROT WAVEGUIDE OPTICAL DEMULTIPLEXER

DESCRIPTION

1. Technical Field

This invention relates to a method and apparatus for providing high resolution wavelength demultiplexing.

2. Background of the Invention

There have been many attempts to develop a compact, high resolution waveguide demultiplexer or spectrometer for application in areas such as spectroscopy, optical networks and optical links. Such a demultiplexer can be extremely critical in wavelength division multi-access (WDMA) networks and wavelength division multiplexing (WDM) links (P. E. Green, *Fiber Optics Networks* Prentice Hall, 1992). In these networks or links, each node or channel is assigned a distinct and unique wavelength for data transmission. In a WDMA network, the data from each node is broadcast to every other node in the network with a passive optical star coupler. Thus, the optical fiber that connects each node carries many discrete wavelength channels and a particular wavelength is selected before the data is received. The data reception can be achieved by combining a wavelength demultiplexer, photodetectors and electronic selection circuitries. The situation is similar in WDM links, where many wavelengths are multiplexed and transmitted through a single optical fiber to increase the capacity of the fiber. Once again the receiver must demultiplex the many wavelengths and select the proper channel for reception. In these applications, the requirements on the wavelength demultiplexer are: an optical bandwidth >30 nm, a wavelength resolution of a few Å, polarization insensitivity, compactness, low loss, low crosstalk, and a low manufacturing cost.

At present, there are many known methods of selecting particular wavelengths, however, none is ideal for the applications outlined above. Such methods rely either on bulk optics or waveguide structures, where the frequency selective element is either an interference grating or a Fabry-Perot (F-P) cavity. Bulk optics are generally too large and expensive for fiber based WDM applications. Diffraction gratings have been known for many years and produce a high resolution spectrum where the wavelength is a function of the diffracted angle. Thus a single grating can demultiplex many wavelengths. However, such bulk gratings are expensive and difficult to use with optical fibers.

A Fabry-Perot resonator can also be used to demultiplex the light. Though more compact than the grating, the F-P can only extract a single wavelength, and the resonator must be specifically designed for that particular wavelength. Since it is impractical to fabricate hundreds of different devices, one for each wavelength channel, there have been a number of attempts to modify the resonator to yield an entire spectrum. Thus mechanically adjustable resonators have been fabricated to overcome this limitation. A mechanically tunable structure using optical fibers has been described by Stone et al. in U.S. Pat. No. 4,861,136. A similar structure using a large area silicon membrane is explained by Mallison in U.S. Pat. No. 4,825,262. However, mechanical interferometers are necessarily slow in changing wavelengths, and are therefore incompatible with the requirements of high speed communications.

Another method to yield a spectrum from a Fabry-Perot resonator is to use a device where the resonant wavelength is a function of position. For example, in a tapered Fabry-Perot cavity, each part of the device responds to a particular wavelength. A tapered F-P structure is extensively discussed by K. D. Vincent in U.S. Pat. No. 5,144,498. The disadvantage of such a structure is that the incoming light must be distributed along the entire length of the taper, and only a small part of the device responds to the desired wavelength. Thus all the light that falls on the tapered structure in the other regions is wasted. For example a demultiplexer that resolves 100 channels will necessarily waste 99% of the power. Not only are these tapered F-P structures inefficient, but they suffer from the manufacturing complexity and fiber incompatibility of other bulk optical devices.

More compact structures can be fabricated using a planar waveguide geometry, where frequency selective elements are imbedded in a waveguide structure. The most common approach is to lithographically pattern a diffraction grating in an integrated waveguide. These devices are more appropriate for use with fibers, but they can be difficult and expensive to manufacture. The diffraction grating has to be made to very high tolerances which frequently requires a direct-write electron-beam system. Thus the presence of gratings can substantially complicate the manufacturing process and drastically increase the cost. Such gratings take many forms and use different topologies to achieve the wavelength selection. A Rowland configuration that both selects and focuses the light has been reported by J. B. D. Soole, A. Scherer, H. P. LeBlanc, N. C. Andreadakis, R. Bhat and M. A. Koza in *Applied Physics Letters* vol. 58, pp. 1949–1951, 1991, and C. Cremer, N. Emeis, M. Schier, G. Heise, G. Ebbinghaus and L. Stoll in IEEE *Photonics Technology Letters* vol. 4, pp. 108–110 1992. A waveguide device based on phase shifts between adjacent arms has been reported by H. Takahashi, Y. Hibino, Y. Ohmori and M. Kawachi in IEEE LEOS'92 Conference Proceedings pp. 688–689, 1992 and C. Dragone in IEEE *Photonics Technology Letters* vol. 3, no. 9, pp. 812–815, 1991. A similar channel dropping filter with grating physically written on the channel waveguide has been reported by M. Levy, L. Elada, R. Scarmozzino, R. M. Osgood, P.S.D. Lin and F. Tong in IEEE *Photonics Technology Letters* vol. 4 no. 12, pp. 1378–1381 1992. All the above devices suffer from the complicated and expensive process of fabricating a diffraction grating on a waveguide.

To overcome the cost and complexity associated with waveguide gratings, there have been attempts at fabricating frequency selective waveguide devices that do not require diffraction gratings. Unfortunately, these grating-less devices almost always suffer from poor resolution and require long interaction lengths. In order to make waveguides more compatible with optical fibers, anti-resonant reflecting optical waveguides (ARROW) have been developed. Such waveguides use a distributed Bragg reflector (DBR) to replace at least one of the mirrors of the waveguide. Since the DBR reflectivity is a function of wavelength and incidence angle, effective single mode operation can be achieved with a large core region. This provides a better match for the optical fiber and increases the coupling efficiency. ARROW structures were first used by M. A. Duguay, Y. Kokubun, T. L. Koch and L. Pfeiffer in *Applied Physics Letters* vol. 49, pp. 13 1986. Since the reflectivity of the DBR is a function of wavelength, it is also possible to use the ARROW structure as an optical demultiplexer. A DBR mirror whose thickness changes as a function of position can demultiplex many wavelengths and allow them to exit at different points on the waveguide. Thus Baba et al. fabricated a position dependent device relying on the frequency dependent reflectivity of the ARROW layers. (T. Baba, Y. Kokubun and H. Watanabe *IEEE Journal of Lightwave Technology* vol. 8, pp. 99 1990). However, since their structure did not use a high finesse resonator but simply relied on frequency dependent reflectivity of ARROW layers the resolution of the device was limited to ~800 Å.

Another method to obtain frequency selectivity is by using coupling between dissimilar waveguides. If two waveguides with the same propagation constants are brought in close proximity, as in a directional coupler, then the light can couple from one waveguide to the next. If the waveguides are fabricated from dissimilar materials, then the phase matched condition is only satisfied at a particular wavelength, and thus the device can extract a single wavelength from a spectrum of incoming wavelengths. The theory was first discussed by H. F. Taylor in *Optics Communication* vol. 8 p. 421, 1973, and later received a more complete treatment by D. Marcuse in IEEE *Journal of Lightwave Technology* vol. 5, pp. 113 1987. Directional couplers that operate on this principle have been fabricated using Ti doped $LiNbO_3$ (R. C. Alferness and J. J. Veselka, *Electronics Letters* vol. 25, pp. 466 1985). Unfortunately, the performance of these structures have been extremely poor. For example, the device by Alferness et al. achieved a resolution of 750 Å at a coupling length of 9 mm. A further disadvantage of such a structure is that it can only select a single wavelength. Much like the single F-P resonator, a different device must be used for every wavelength channel.

SUMMARY OF THE INVENTION

It is therefore an object of this invention to provide a compact, high resolution and large channel capacity wavelength demultiplexer covering a wide spectral range with low loss. It is a further object of this invention to provide a wavelength demultiplexer which can be produced in low-cost compact form by lithographic methods.

The wavelength demultiplexer described here has a very simple structure and should be low cost. The manufacturability and price are key elements in the success of optical links and networks. The device structure is composed of an input waveguide parallel and in close proximity to a wavelength selective resonator. A common mirror between the two allows a small leakage of the waveguide optical mode into the resonator. The light enters the structure through an optical fiber attached to the input waveguide and light whose wavelength matches the resonator is selected and is removed from the waveguide. Since the resonator is weakly coupled to the input waveguide, it has no influence on the input waveguide except at resonance, and the input guide is therefore low loss. Since the other wavelengths are unaffected by the resonator, they remain in the waveguide and can be reused. By making the resonance wavelength of the resonator be a function of position along the device, this wavelength selective element can be used to obtain a spectrum of the incident light. Thus light of different wavelengths are selected by the resonator and are collected at different points in the structure. Our device is similar to the tapered F-P discussed earlier, except that the light not at resonance is maintained in the waveguide and is not wasted. The waveguide and resonator structures are best fabricated using an antiresonance reflecting optical waveguide (ARROW) geometry. In this way the waveguide mode can be made quite large, and this facilitates the optical coupling to the fiber. The high reflectivities achieved by ARROW layers are also appropriate for the fabrication of the resonator. The resonator can best be thought of either as a parallel waveguide, forming a directional coupler, or as a Fabry-Perot (F-P) cavity. Mathematically, the two structures are identical. Thus the resonator has two high reflectivity coatings on each side and the resonance waveglength is determined primarily by the thickness of the spacer region between the two mirrors. This thickness is made to vary with position, allowing light of different wavelengths to be extracted at different positions in the device. Either discrete steps or a taper can be used to obtain the width fluctuations. The photodetection is implemented either by placing a photodetector array directly below the resonator, or alternatively the resonator itself is lithographically patterned and acts as a photodetector.

Accordingly, this invention relates to an apparatus for selecting at least one optical frequency from a plurality of optical frequencies and comprises the following elements:

A waveguide with a partial mirror along its length to reflect transmitted optical frequencies within the guide, and an optical resonator which uses the partial mirror as one of its resonating mirrors and which resonates the selected frequency which is extracted from the guide.

A more specific implementation of this invention provides a waveguide demultiplexer which extracts different wavelengths at different positions along the guide. Since each resonator has a negligible effect on the other wavelengths traveling in the input waveguide, the device is low loss and efficient. It can be fabricated at low cost as no expensive diffraction gratings are needed. Furthermore, the compact waveguide nature allows compatibility with fiber-based systems.

BRIEF DESCRIPTION OF THE DRAWINGS

FIG. 3.1–3.3 shows the optical power in each guide as a function of distance.

DESCRIPTION OF THE PREFERRED EMBODIMENT

Figure 1:
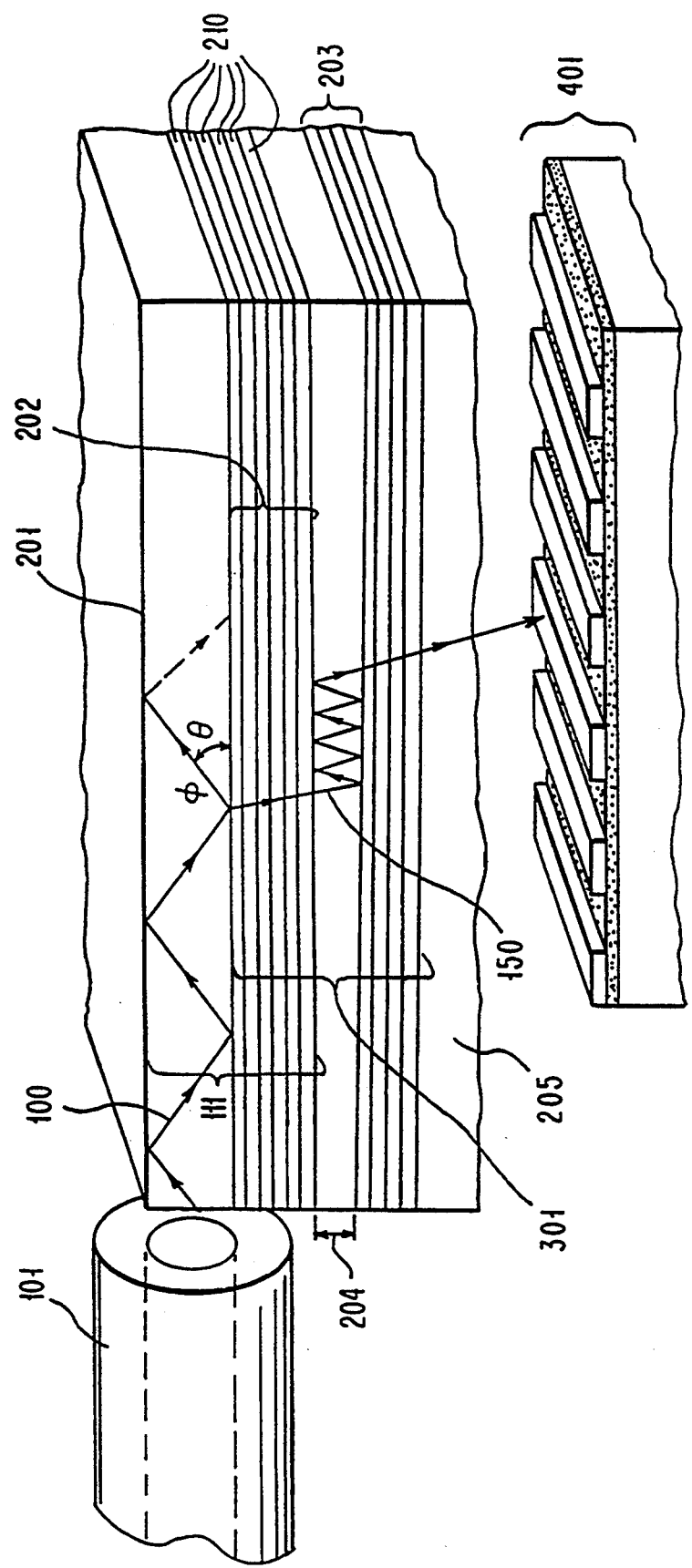
FIG. 1 graphically illustrates the preferred embodiment of the invention.

The preferred embodiment of this invention is illustrated in FIG. 1. Design values for the various parameters of the device are explained later in this section, and a specific example and demonstration is discussed in the next section. Incoming light in optical fiber 101 which is composed of many discrete wavelengths or optical channels is coupled to the input waveguide 111 of ARROW configuration. The waveguide has two mirrors on either side. The top material-air interface 201 of power reflectivity R1 is a perfect reflector to the optical waves traveling in the waveguide 111 because of total internal reflection. The multilayer mirror 202 of power reflectivity R2 provides the second mirror and causes the necessary reflection from the bottom surface of the waveguide 111. This mirror is most conveniently fabricated as a distributed mirror (DBR) composed of many ¼ wave layers 210. Because of total internal reflection at 201 and high values of R2 at 202, the optical wave traveling in the waveguide 111 suffers very little attenuation. Our device is more than a conventional ARROW structure in that another multi-layer mirror 203 of power reflectivity R3 is fabricated some distance 204 below the multilayer mirror 202. The combination of mirror spacing 204, mirrors 202 and 203 form a resonant F-P cavity 301. Thus we have a waveguide structure and a resonator with a joint mirror 202. The optical waves traveling in the waveguide 111 are generally not influenced by the mirror 203 except at the optical wavelengths that resonate with the F-P cavity. At this condition, the optical waves will then leak from waveguide 111 to substrate 205. The index of refraction of the path 100 in the interior of the waveguide is made to be lower than the index of refraction as seen by the optical frequencies in path 150 in the interior of the resonator 301. To allow different wavelengths to exit at different positions, the thickness of the resonant cavity is made to vary with distance. This can be achieved either by using discrete steps, or with a gradual taper. Since the mirror layers are anti-resonant (¼ wave), their reflectivities are not a sensitive function of their widths, and thus it is inconsequential if their thicknesses are tapered or not. However, a taper in the mirrors 202 and 203 that corresponds to the taper in the cavity will increase the resolution of the device. To detect the signal from the different wavelengths, an array of photodetectors 401 are positioned underneath the substrate 205. Thus each photodetector will receive light of only one wavelength channel.

As an alternative way of understanding the coupling between the resonator and the waveguide, one may consider the structure as a modification on a directional coupler. If we neglect the taper and assume a uniform thickness for every layer in the device, we can consider the resonator 301 as another waveguide. Thus we have two waveguides in proximity similar to a directional coupler. The two waveguides are coupled through the common mirror 202. However, the lower waveguide (resonator) 301 is leaky since R3, the reflectivity of the bottom mirror 203, is not equal to unity. Generally, conventional directional couplers are fabricated with two identical waveguides, and great pains are taken to ensure that the device is exactly symmetric. The optical mode is resonant in both waveguides, and thus the light couplers back and forth between the two guides in the manner of classical coupled oscillators. Since the two waveguides are identical, the directional coupler is not very wavelength sensitive and the light continues to be resonant in both waveguides. In our case, however, the second waveguide (resonator) 301 is very different from the first waveguide 111. Ideally, the core of the waveguide (resonator) 301 is composed of material with much higher refractive index than the core of waveguide 111. Therefore the propagation constants of the two waveguides only match at one particular wavelength, and only that wavelength is coupled to the second waveguide 301. Furthermore, since this waveguide (resonator) 301 has an imperfect mirror R3, the light coupled into it leaks out very rapidly. The reflectivity of this mirror 203 must be chosen appropriately, since a reflectivity that is too low will destroy the resonance and the coupling to the second guide (resonator) 301, while a reflectivity that is too high will limit the extraction of the light out of the device.

Figure 2:
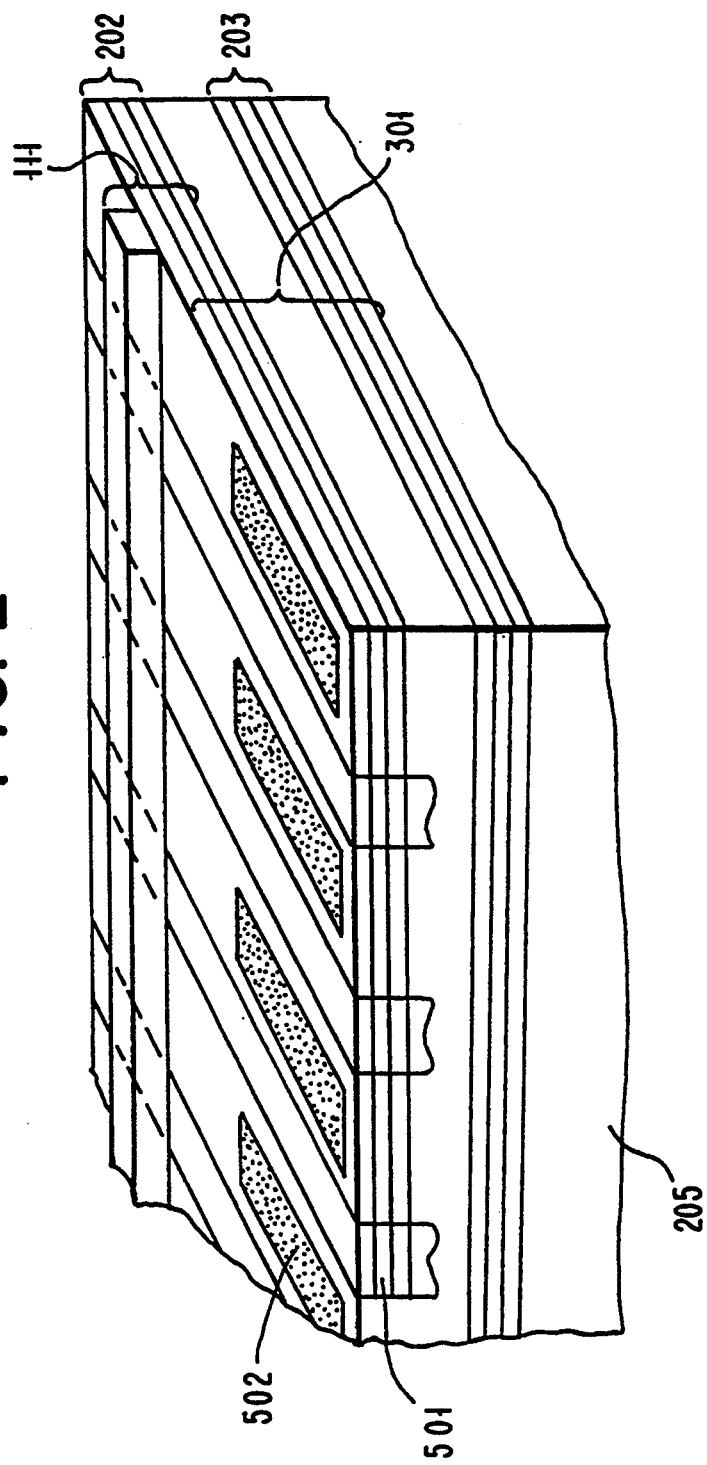
FIG. 2 graphically illustrates an integrated embodiment of the invention made using Metal-Organic Chemical Vapor Deposition (MOCVD) with photodectors fabricated within the device.

There are numerous variations on this design. Instead of a taper, the resonator thickness can be fabricated with stepwise variation. The entire structure can be made upside down relative to the substrate, with the resonator 301 and the photodetectors 401 lying on top of the waveguide 111. Thus the absorption and scattering in substrate 205 can be eliminated. In this case the resonator would have one DBR mirror and one total internal reflection mirror, while the input waveguide would have two DBR mirrors. Since the entire structure can be made with semiconductors using techniques such as Metal-Organic Chemical Vapor Deposition (MOCVD), the photodetectors can be fabricated within the device, or even the F-P cavity could be doped p-i-n to act as the photodetecting region. This integrated embodiment is shown in FIG. 2. In this case the bottom mirror 203 is made with reflectivity R3 close to unity and is doped to form one side of a p-i-n diode. The resonator 301 is made to be slightly absorbing, such that the cavity loss is equivalent to the imperfect reflector R3 described in the previous embodiment and FIG. 1. The top reflector 202 is doped to form the other side of the diode, with the spacing 204 forming the intrinsic depletion region. The top waveguide 111 is formed by depositing a dielectric on the semiconductor wafer and subsequent patterning. The diodes themselves are patterned using a proton implant 501 to cause damage for isolation, and contacted by depositing metal pads 502 beside the waveguide 111. The other electrical contact can be made through the substrate.

The exact design of the device depends on the particular materials and the desired performance. If we examine the waveguide 111 from a ray optics perspective, we can obtain simple equations that govern the design. Since the fundamental mode will be TE, we will ignore higher order TM modes. We define $\theta$ to be the angle between the beam and the horizontal, and $\phi$ to be the angle between the ray and the normal ($\phi + \theta = 90°$), as shown in FIG. 1. The ray optics approach gives us the angle of the mode:

$$2n_c d_c k_o \sin\theta + \phi_1 + \phi_2 = 2\pi\nu \qquad (1)$$

where $d_c$ is the thickness of the guide, $k_o$ is the propogation constant of the light in free space, $n_c$ is the index of the core in the guide, $\phi_1$ and $\phi_2$ are the phase shifts on reflection from the top surface 201 and the bottom surface of the guide (interface between waveguide 201 and mirror 202), and $\nu$ is an integer corresponding to the optical mode number. We can define an effective thickness for the waveguide $d_{eff}$ that includes the influence of the two phase shifts. The phase shift from the bottom can be neglected in the first analysis since the reflectivity is very high and there is little penetration of the optical field. The total internal reflection at the top causes a Goos-Hanchen phase shift that is non-negligible. The effective guide thickness becomes:

$$d_{eff} \simeq d_c + \frac{\lambda}{2\pi \sqrt{n_c^2 - n_o^2}} \qquad (2)$$

where $n_o$ is the index of the cover, or air, and $\lambda$ is the free space wavelength of the light. There is no Goos-Hanchen shift for any other layers except the top most layer. Therefore, the effective thicknesses of these other layers are approximately equal to their actual thicknesses. The layers used in the mirrors should be an equivalent of ¼ wave thick, and the cavity spacing (204) should correspond to an integer number of half waves. Since we are at oblique incidence, we can use an effective refractive index or admittance $\eta$ for each layer, given by $\eta = n \cos \phi$, where n is the conventional refractive index and $\phi$ corresponds to the angle in the layer. The angles in the different layers can be derived from Snell's law: $n_i \sin \phi_i = n_j \sin \phi_j$. Taking into account the angular dependence, one can show that the thickness of the jth layer should be:

$$d_j = \frac{(\lambda/4n_j)}{\sqrt{1 - (n_c/n_j)^2 + (\lambda/2n_j d_{eff})^2}} \qquad (3)$$

The reflectivity of the stacks are easy to compute if the layers are all optimized. Since adding an additional quarter wave layer changes the admittance of the multilayer to the admittance of the added region squared divided by the old admittance, the reflectivity of P+½ periods, with the high index on both sides can be written as:

$$R = \left( \frac{\eta_c - \eta_{stack}}{\eta_c + \eta_{stack}} \right)^2 \qquad (4)$$

$$\eta_{stack} = (\eta_H/\eta_L)^{2P}(\eta_H^2/\eta_L) \qquad (5)$$

where $\eta_c$ is the admittance of the core waveguiding region, and $\eta_H$ and $\eta_L$ are the admittance of the high and low index materials used in the ¼ wave stacks respectively.

In a conventional Fabry-Perot cavity operated at normal incidence, the optical field builds up in the cavity until it is many times the intensity of the incident field. At this point the light that leaks out from the cavity in the direction of the incident beam interferes destructively with the light reflected from the front mirror, and causes the total device reflectivity to be zero. Thus all the light is transmitted through the device. The situation is a little different in our device. Since the resonator is operated at oblique incidence, the optical field that has built up in the cavity propagates in the same direction as the incoming beam in the first waveguide. Consequently, it takes some finite distance for the optical field to build up. Secondly, as the optical field builds up in the resonator, it subtracts from the light intensity in the original guide, thus the incident intensity is not a constant. To get an accurate analysis we must use coupled mode equations that consider both these effects. Qualitatively we can see that the resolution or the wavelength selectivity of the device can be increased by using higher reflectivity mirrors. However, the resulting higher finesse cavity will increase the time and distance needed for the optical field to build up in the resonator, taking a longer distance to couple the light out from the device. We can minimize this distance by increasing the refractive index of the resonator, since due to Snell's law, the rays will be closer to normal, and the lateral distance required for the optical field to build up will be smaller.

We can write the coupled mode equations for our structure as:

$$d\alpha_1/dz = j\beta_1\alpha_1 + jK_{coupl}\alpha_2 \qquad (6)$$

$$d\alpha_2/dz = j\beta_2\alpha_2 + jK_{coupl}\alpha_1 - \alpha_2/l \qquad (7)$$

Where $\alpha_1$ and $\alpha_2$ are the optical fields in the two waveguides with propagation constants $\beta_1$ and $\beta_2$. In the ray optics formalism, the propagation constant can be expressed as $\beta = k_o n \sin \phi$. $K_{coupl}$ is the coupling between the two waveguides, determined mainly by the center mirror reflectivity R2, and l is the characteristic distance for the optical field to decay from the second guide. We are most interested in the phase matched case when $\beta_1 = \beta_2 = \beta$. In this case, the second waveguide or resonator can fully extract the particular wavelength that corresponds to its propagating mode from the first waveguide. One can show that the coupling constant can be related to the center mirror reflectivity R2 by:

$$K_{coupl} = \frac{2\pi \sqrt{1 - R2}}{4d_1 d_2 \beta} \qquad (8)$$

Where $d_1$ and $d_2$ are the effective thicknesses of the two waveguides. Similarly, we can show that the loss distance l can be related to the mirror reflectivity R3 by $$l = \frac{4d_2^2 \beta}{\pi(1 - R3)} \qquad (9)$$

If we solve the coupled mode equations for this phase matched system when mirror 203 is a perfect reflector (R3=1) and there is no loss (l=∞), we obtain the conventional result of the optical field coupling back and forth between the two waveguides, with a coupling length given by $$L_{coupl} = \pi/2K_{coupl} \qquad (10)$$

Thus in one coupling length all the power is coupled from one waveguide to the next. As we increase the loss from the waveguide by reducing the reflectivity of the bottom mirror, then the sinusoidal oscillations become damped. Finally at a critical damping factor, the optical field in the waveguides are extracted in the shortest possible distance with no coupling back into the original waveguide. This occurs when $$l = \tfrac{1}{2} K_{coupl} \qquad (11)$$

This equation governs the operation of the device. To get efficient extraction the device must be designed to satisfy this constraint. If R3 is too reflective, the light will couple back and forth between the guides many times before being extracted, while if R3 is too low, the system is overdamped, and the light takes a longer distance to couple into the second guide and out of the device. To verify this principle, we numerically solved the coupled mode equations for a variety of conditions. The optical power in each guide as a function of distance are shown in FIG. 3. In FIG. 3.1 we modeled a coupled system with a coupling length of 5 microns that's under damped. The two lines show the optical intensity in each guide. In 3.2), the loss is adjusted to provide critical damping, and the optical energy is extracted in about two to three coupling lengths. 3.3) shows a system where R3 is too low and the system is overdamped, thus light takes much longer to be extracted.

To estimate the wavelength resolution of the device, we again return to the coupled mode equations and examine the situation when phase-matching is not obtained. As the wavelength differs from the phase matched condition, $(\beta_1 \neq \beta_2)$ the coupling between the two guides is reduced. Solving eqs (6) and (7) we find that the coupling between the two resonators is efficient as long as $$(\beta_1 - \beta_2) \simeq 2K_{coupl} \tag{12}$$

This translates to a wavelength resolution given by $$\Delta\lambda = \frac{\lambda^3 \sqrt{1 - R2}}{4\pi d_1 d_2 (n_2^2 - n_1^2)} \tag{13}$$

We would expect this $\Delta\lambda$ to correspond roughly to the HWHM of the response. Thus as we try to increase the resolution of the instrument by increasing the center mirror reflectivity, we pay the price of a longer coupling length. The trade-off between the coupling length and the resolution can be expressed by:

$$L_{coupl}\Delta\lambda = \frac{\beta\lambda^3}{4\pi(n_2^2 - n_1^2)} \tag{14}$$

This trade-off can be improved by modifying the structure. Adjusting the size of the resonator 301 and increasing its thickness will allow a higher mode to propagate at the correct wavelength, though it also increases influences the coupling length. In terms of F-P cavities, we can obtain higher resolutions by using higher order cavity modes. A similar effect, but without the deleterious result of increasing the coupling length can be obtained with the ¼ wave mirrors. Though there is no phase shift on reflection from the mirrors at the design wavelength, there is a phase shift at other wavelengths. This frequency dependent phase characteristic can significantly increase the resolution of the instrument. For a perfect reflector fabricated from ¼ wave layers, we can show that the phase shift on reflection is approximately linear, with a derivative of:

$$\frac{d\phi}{d\lambda} = \frac{\pi\eta_H\eta_L}{\lambda_0\eta_0(\eta_H - \eta_L)} \tag{15}$$

where $\eta_H$ is the high index admittance, $\eta_L$ is the low index admittance, and $\eta_0$ is the admittance of the cavity. $\lambda_O$ is the design wavelength of the mirrors. If we include this phase factor in our calculation of $\beta$ we find that $\beta$ varies much faster with wavelength and the resolution is enhanced considerably. Of course to benefit from this phase response of the mirrors, the design wavelength of the mirrors must be tapered along with the cavity length, otherwise the resonance of the cavity will be shifted by the phase change. This taper in the mirrors is naturally obtained by fabrication processes that grow the mirrors and the cavity in the same deposition system.

Though our discussion has been limited to ARROW structures, where equivalent quarter-wave layers are used to form the mirrors, the device can also be fabricated using conventional waveguides. In this case the mirrors are not ¼ wave layers of high index materials, but low index cladding regions. The disadvantage of this approach is that waveguides have to be very thin to remain single mode. Since ARROW waveguides are optimized at a particular angle, they are lossy at other angles corresponding to higher modes and effective single mode operation is achieved. The thinner guides in conventional single mode structures are harder to couple to fibers that have large mode sizes. However, using lensed fibers and other novel techniques, it may be practical to fabricate these devices using conventional waveguide structures. The above equations would dictate the design and operation of the device. However, since cladding regions rather than ¼ wave mirrors are used, the Goos-Hanchen shift must be taken into account at each interface. Thus eq. (2) will contain 2 additional terms, one for each interface. Since this equation is approximate, and only valid for small angles a more accurate value for $d_{eff}$ may be derived for eq. (1) using the full Goos-Hanchen phase shift at each interface:

$$\Delta\phi = \pi + 2\tan^{-1}\left(n_H \frac{\cos\phi}{\sqrt{n_H^2\sin^2\phi - n_L^2}}\right) \tag{16}$$

Where $\eta_H$ is the refractive index in the guiding region and $\eta_L$ is index of the cladding. Since the phase shift $\Delta\phi$ is dependent on the unknown mode angle $\phi$ in the guide, equations (1) and (16) must be solved together to compute the effective guide thickness $d_{eff}$. Once this has been computed, the reflectivity of the thin lower index region acting as R2 can be estimated.

$$R = 1 - \frac{16k_1k_3\gamma^2 e^{-2\gamma a}}{(k_3^2 + \gamma^2)(k_1^2 + \gamma^2)} \tag{17}$$

where $k_1$ and $k_3$ are equal to $\sqrt{n^2k_0^2 - \beta^2}$ in the two guiding regions on either side of the reflecting low index layer, and $\gamma$ is $\sqrt{\beta^2 - n^2k_0^2}$ in the center region. Using equations (15) and (16) we can fabricate our spectrometer using conventional waveguide structures with low index cladding regions.

The above description is tailored for TE polarization. There are existing schemes to detect both TE and TM polarization by means of polarization diversity. Briefly, the polarizations of the optical signal are separated into the TE and TM modes and the TM mode is rotated by 90°. Both modes are fed into two separate but similar waveguide demultiplexers. Detection can be achieve by one large area detector or by combining the electrical signals of two separate detectors. Similar techniques are described by D. A. Smith, J. E. Baran, J. J. Johnson and K. W. Cheung in IEEE *Journal on Selected Areas in Communications* vol. 8 pp. 1151-1159, 1990.

Demonstration

To demonstrate the principle of the device, described mathematically by the above equations, we grew a hybrid structure using MOCVD grown GaAs/AlGaAs mirrors and resonator, and used an evaporated glass waveguide. The nonuniformity of the MOCVD growth was used to yield a 9% taper along the 4.5 cm chip. We then designed the device so the natural taper would give the light adequate distance to couple out of the waveguide when passing through resonance. We used a semiconductor resonator and a glass waveguide to get a large difference in refractive index, since this increases the resolution and decreases the coupling length. The materials used were $Al_{0.3}Ga_{0.6}As$ with a refractive index of 3.5, AlAs with an index of 3.0, and $SiO_2$ with an index of 1.46. The structure included a 16.5 period backmirror 203 using $Al_{0.3}Ga_{0.6}As$/AlAs quarter-wave layers. Since we grew the structure on a GaAs substrate with a high refractive index, AlAs regions were on the outer sides of the mirror. The calculated reflectivity of R3 was 99.52%. The resonator was composed of 1178 Å of $Al_{0.3}Ga_{0.6}As$ at the center of the wafer, and the middle mirror 202 (R2) consisted of seven periods of $Al_{0.3}Ga_{0.6}As$/AlAs quarter-wave layers, ending with an AlGaAs layer. The top waveguide was fabricated by evaporating 4 μm of $SiO_2$. The device was designed to operate at a vacuum wavelength of approximately 7500 Å with a mode angle in the $SiO_2$ of 3.581 Å. At this wavelength all the layers are transparent, and the light that is selected by the spectrometer enters the GaAs substrate and causes luminescence. This longer wavelength light generated by the substrate (8800 Å) could then be detected and imaged on a silicon detector. Using the above equations at the center wavelength, we calculated a propagation constant $\beta$ of 12.21 $\mu m^{-1}$, an effective thickness for the glass waveguide of 4.112 μm, $K_{coupl}$ of 0.0231 $\mu m^{-1}$, and a 1/l of 0.0438 $\mu m^{-1}$. The calculated reflectivity 3f the lower mirror 203 was designed to be a little higher than that dictated by eq. (11), since we expected scattering and errors in the fabrication to lower the actual value. Since the the top reflector 202 operates at much sharper angles of incidence, the high reflectivity should be easier to achieve, and it was not deliberately compensated for errors in the fabrication. The predicted coupling length is found to be 68 μm, and as shown by FIG. 3.2B, we would expect most of the light to couple out within a few coupling lengths. The expected resolution (FWHM) is about 12 Å neglecting the influence of the ¼ wave mirrors. The mirrors increase the resolution by about a factor of 4. However, we would expect the gradual taper to reduce the performance, since considerable amounts of light are extracted before the phase-matched condition.

Figure 4:
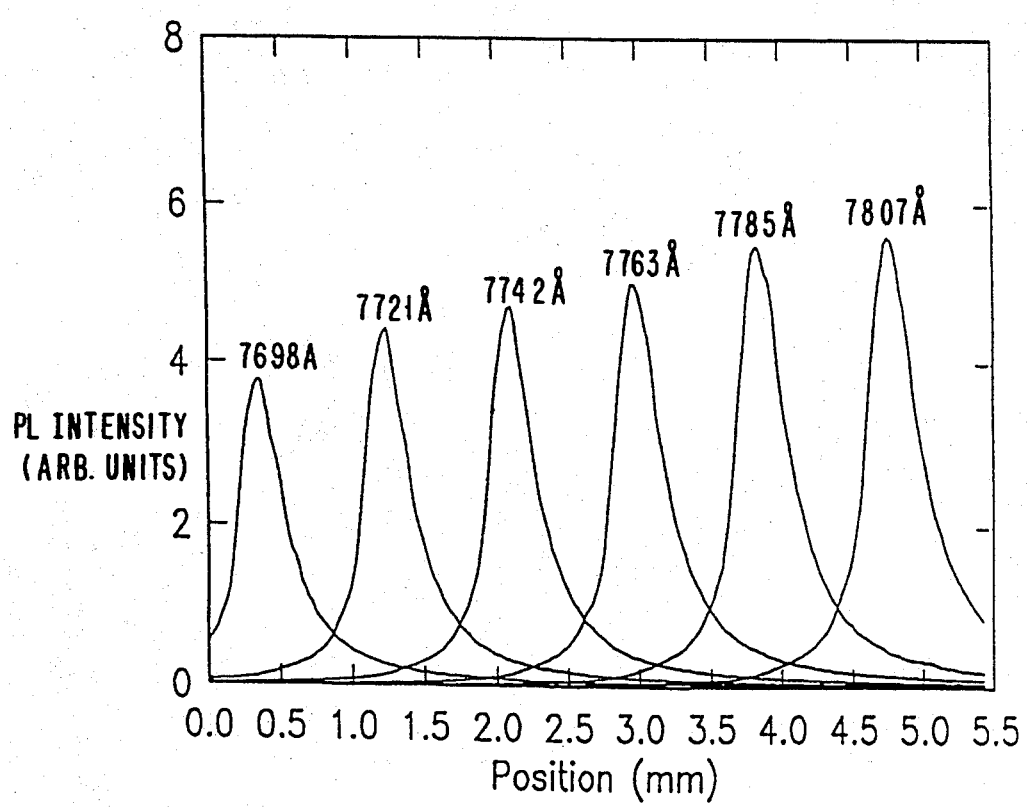
FIG. 4 graphically illustrates experimental results as the wavelength is changed in approximately 20 angstrom intervals.
Figure 5:
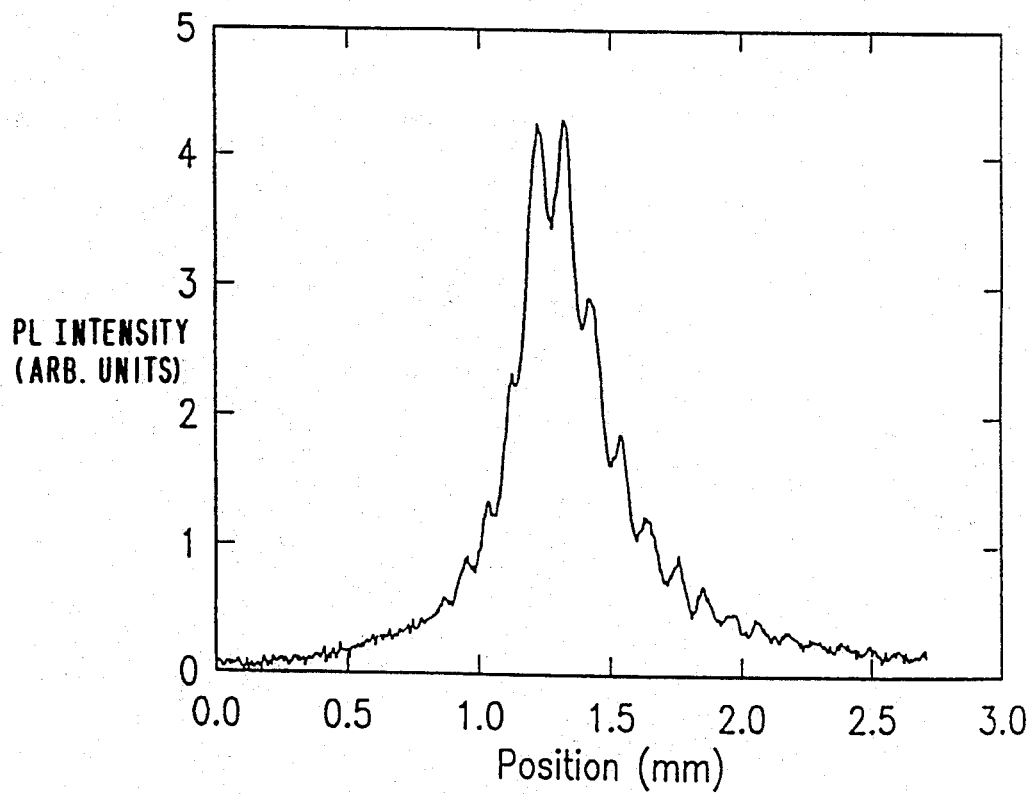
FIG. 5 graphically illustrates a high resolution scan of one of the peaks of FIG. 4 using a narrower slit.

To measure the performance of the device, we used a tunable Ti: sapphire laser and coupled the light into the waveguide using a cleaved facet. The chip was imaged, and a narrow slit was used to limit the light detected to a thin stripe on the chip. We measured the position dependence of the luminescence as the wavelength was varied. FIG. 4 shows the experimental results as the wavelength was changed by approximately 20 Å intervals. Clearly the position of the luminescence changes at different wavelengths. The light is incident from the right, and the reduction in peak size at the left of the graph is due to waveguide loss and scatter. FIG. 5 is a higher resolution scan of one of the peaks using a narrower slit. The FWHM of the peak is about 250 μm. The smaller peaks superimposed on the larger one are caused by the light coupling back and forth between the two waveguides, with an expected period of two coupling lengths $L_{coupl}$. This shows that our system is under-damped and explains the larger distance required for the coupling. The observed spacing between the small peaks is about 100 μm, close to the predicted value of 135 μm. The slightly smaller value implies that our experimental value for R2 was a little lower than what we calculated (98.6% instead of 99.4%). This lower reflectivity for R2 would also contribute to the under-damped condition. To measure the wavelength resolution, we kept the position of the detector fixed and carefully tuned the Ti: sapphire laser to measure the wavelength FWHM. The measured value of about 8 Å compares favorably with our expectations.

Despite the experimental errors in the fabrication, the results of FIGS. 3 and 4 show that the device works in accordance with theory. Despite the slightly lower performance caused by fabrication errors, we have a compact device with high resolution. If we assume a channel spacing of one FWHM, the 4.5 centimeter chip can yield over 200 channels. The structure can of course be integrated with a photo detector array and packaged to act as a spectrometer. The detectors could either be fabricated below the bottom mirror, or the resonator itself can be doped to act as a photodetector. Integrated with detectors, such devices should be extremely useful for WDM applications.

Having thus described our invention, what we claim as new and desire to secure by Letters Patents is:

1. An apparatus for obtaining at least one selected optical frequency from a plurality of optical frequencies, comprising:
   a. a waveguide having a partial mirror along its length to reflect transmitted said optical frequencies within said guide; and
   b. an optical resonator, having an optical thickness for optical resonance, with one of its resonating mirrors being said partial mirror with said selected frequency being extracted from said guide and resonated in said resonator.

2. An apparatus as recited in claim 1, wherein said resonator has a resonating cavity with variable thickness along its length so as to generate different resonant frequencies at different positions along its length.

3. An apparatus as recited in claim 2, wherein said resonator is a Fabry-Perot resonator.

4. An apparatus as recited in claim 1, wherein said resonator is a Fabry-Perot resonator.

5. An apparatus as recited in claim 1, wherein said waveguide is an anti-resonance waveguide.

6. An apparatus as recited in claim 1, wherein the loss of said resonator is such as to extract the optical energy from said guide in a minimum distance.

7. An apparatus as recited in claims 1, wherein a path of said optical frequencies in said waveguide has lower index refraction than a path in said resonator cavity.

8. An apparatus as recited in claim 1, wherein said resonator is configured as a photo detecting element with at least one said selected optical frequency being converted to electrical signals.

* * * * *